G. CLAUDE.
METHOD FOR SEPARATING NEON FROM GASES WITH WHICH IT IS MIXED.
APPLICATION FILED JUNE 17, 1913.
1,191,495. Patented July 18, 1916.
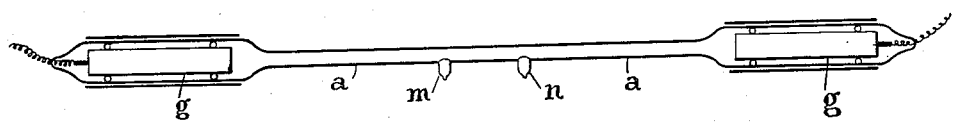
WITNESSES
E. G. McGee.
G. Tate.
INVENTOR
Georges Claude
BY
ATTORNEY

UNITED STATES PATENT OFFICE.

GEORGES CLAUDE, OF BOULOGNE-SUR-SEINE, FRANCE.

METHOD FOR SEPARATING NEON FROM GASES WITH WHICH IT IS MIXED.

1,191,495.   Specification of Letters Patent.   Patented July 18, 1916.

Application filed June 17, 1913. Serial No. 774,265.

*To all whom it may concern:*

Be it known that I, GEORGES CLAUDE, a citizen of the Republic of France, and resident of 14 Boulevard d'Auteuil, Boulogne-sur-Seine, France, have invented a new and useful Method for Separating Neon from Gases with which It is Mixed, which is fully set forth in the following specification.

It has been found that if a closed vessel provided with electrodes of carbon or of a metal such as iron, copper, etc., contains rarefied gases such as nitrogen, oxygen, helium, etc., the said gases are absorbed comparatively quickly if a prolonged electric discharge is caused to pass between the electrodes. I have found however that, by way of exception, when the atmosphere of the inclosure is constituted by neon, the absorption of the said gas is considerably more slow, with the equal degree of rarefaction, than in the other cases and the smaller, the greater the surface of the electrodes.

This invention relates to a process for purifying the neon from the gases with which it is mixed, based on the above mentioned phenomena.

It must in fact follow from the preceding, and it has been observed in reality that, if the mixture of neon with foreign gases is introduced into a closed vessel at a pressure varying between 0 and 10 millimeters of mercury and if an electric discharge is then caused to pass in a prolonged manner through the electrodes, the foreign gases are absorbed more quickly than the neon, so that the latter finally remains in a state of purity, or at least in conditions of sufficient purity to be alone visible—sometimes with hydrogen or argon if they were contained in the mixture—in the spectrum obtained with the residual gas.

In order to facilitate the purification, it may be advisable first of all to remove from the electrodes and the walls of the vessel or inclosure occluded gases which would uselessly dilute the atmosphere to be purified. To that end, a vacuum is previously produced in the vessel or inclosure, and at the same time a current sent through. This may be carried even farther by flushing the inclosure two or three times with the gaseous mixture itself which it is desired to purify, each flushing being followed by the action of the vacuum pump and of the current. For the quickness of absorption of the foreign gases, it may be also advisable to interrupt from time to time the passage of current during a certain time.

In the accompanying drawing is shown diagrammatically, means for carrying out the invention, choosing, by way of illustration, as the receptacle in which the purification of the neon is effected, a luminescent tube such as is shown, for instance, in my application Serial No. 659,360½, filed November 9, 1911. In the drawing, $a$ indicates the tube and $g$ indicates the electrodes which, as hereinbefore indicated, have a sufficiently large surface to reduce to the desired practicable minimum any absorption of the neon, thereby correspondingly guarding against losses of neon. Appropriate dimensions of the superficial area of the electrodes per ampere of current employed are given in my application referred to, the minimum surface area being 1.5 square decimeters per ampere. I have indicated at $m$ and $n$ appropriate branches from the tube suitable for connection with the vacuum pump and for the supply of neon respectively, and which may be ultimately sealed off as shown.

The process is more particularly applicable when the purified neon obtained is to be utilized in a rarefied state and in the inclosure in which it has been obtained. It is more particularly the case when it is desired to obtain rarefied atmospheres extremely permeable to electric discharge, which, as is known, is one of the most remarkable characteristic features of the neon and has found important application in detectors of Hertzian waves, luminous tubes, etc. The very great importance of this process may be seen if it is pointed out that it makes it possible to separate neon from helium, although it is question of two gases which are chemically both equally neutral, and the method of absorbing by carbon at the temperature of the liquid air could no longer separate them, because helium is still less absorbable by the carbon than the neon.

What I claim as my invention and desire to secure by Letters Patent is:—

1. The method of obtaining neon purified from nitrogen, oxygen, helium, etc., in a closed receptacle, provided with electrodes contained therein, which comprises establishing within the receptacle a highly rarefied atmosphere containing neon, and passing an electric discharge between the electrodes, said discharge being continued until the impurities have been removed from the neon to such an extent that they will be practically invisible in the spectrum obtainable from the residual gas.

2. The method of obtaining neon purified from nitrogen, oxygen, helium, etc., in a closed receptacle containing electrodes having a surface large enough to practically avoid absorption of neon during operation, which comprises establishing within the receptacle a highly rarefied atmosphere containing neon, and passing an electric discharge between the electrodes, said discharge being continued until the impurities have been removed from the neon to such an extent that they will be practically invisible in the spectrum obtainable from the residual gas.

3. The method of obtaining neon purified from nitrogen, oxygen, helium, etc., in a closed receptacle, provided with electrodes contained therein, which comprises preliminarily expelling the occluded gases from the walls of the receptacle and from the electrodes, by creating a partial vacuum in the receptacle, and at the same time passing an electric discharge therethrough, then admitting into the receptacle a highly rarefied atmosphere containing neon, and passing an electric discharge between the electrodes, said discharge being continued until the impurities have been removed from the neon to such an extent that they will be practically invisible in the spectrum obtainable from the residual gas.

4. The method of obtaining neon purified from nitrogen, oxygen, helium, etc., in a closed receptacle, provided with electrodes contained therein, which comprises preliminarily expelling the occluded gases from the walls of the receptacle and from the electrodes, by creating a partial vacuum in the receptacle, and at the same time passing an electric discharge therethrough, then purging the receptacle by passing therethrough a quantity of the neon gas atmosphere to be purified, again creating a partial vacuum in the receptacle and at the same time passing an electric discharge therethrough, and so on, until the occluded gases have been practically removed and finally passing an electric discharge between the electrodes for a period sufficiently long to remove practically all of the impurities to such an extent that they will be practically invisible in the spectrum obtainable from the residual gas.

5. The method of obtaining neon purified from nitrogen, oxygen, helium, etc., which comprises confining such gases, together with a substance coacting with the impurities, within a receptacle from which atmospheric air has been to a great extent removed, and passing therethrough an electric discharge until the impurities have been removed from the neon to such an extent that they will be practically invisible in the spectrum obtainable from the residual gas.

In testimony whereof I have signed this specification in the presence of two subscribing witnesses.

GEORGES CLAUDE.

Witnesses:
EMILE LEDRET,
LUCIEN MEMMINGER.